United States Patent [19]
Dickey

[11] Patent Number: 5,875,743
[45] Date of Patent: Mar. 2, 1999

[54] APPARATUS AND METHOD FOR REDUCING EMISSIONS IN A DUAL COMBUSTION MODE DIESEL ENGINE

[75] Inventor: Daniel W. Dickey, Helotes, Tex.

[73] Assignee: Southwest Research Institute, San Antonio, Tex.

[21] Appl. No.: 905,787

[22] Filed: Jul. 28, 1997

[51] Int. Cl.⁶ .................................................. F02B 47/00
[52] U.S. Cl. ...................................... 123/25 C; 123/568
[58] Field of Search ................................ 123/25 C, 568, 123/304, 294

[56] References Cited

U.S. PATENT DOCUMENTS

| | | | |
|---|---|---|---|
| 5,050,550 | 9/1991 | Gao | 123/275 |
| 5,251,582 | 10/1993 | Mochizuki | 123/73 A |
| 5,357,925 | 10/1994 | Sasaki | 123/928 |

FOREIGN PATENT DOCUMENTS

| | | | |
|---|---|---|---|
| 2536240 | 3/1976 | Germany | 123/431 |
| 52-61642 | 5/1977 | Japan . | |
| 60-30417 | 2/1985 | Japan | 123/431 |
| 60-30437 | 2/1985 | Japan | 123/431 |
| 60-36720 | 2/1985 | Japan | 123/431 |

*Primary Examiner*—John T. Kwon
*Attorney, Agent, or Firm*—Jenkens & Gilchrist

[57] ABSTRACT

A diesel engine is adapted to operate in a conventional diesel combustion mode within a first speed and load range, and in a homogeneous charge compression ignition mode in a second load and speed range. When operating in the homogeneous charge compression ignition mode, the emissions are dramatically reduced, resulting in a significant net reduction in emissions over the total load and speed operating range of the engine.

11 Claims, 3 Drawing Sheets

APPARATUS AND METHOD FOR REDUCING EMISSIONS IN A DUAL COMBUSTION MODE DIESEL ENGINE

BACKGROUND OF THE INVENTION

1. Technical Field

This invention relates generally to an apparatus and method for reducing emissions in a diesel engine, and more particularly to such an apparatus and method which adapts a diesel engine to operate, within preselected speed and load ranges in a convention diesel mode, and in other preselected speed and load ranges in a homogeneous charge compression ignition mode.

2. History of Related Art

Conventional diesel engines tend to emit relatively high concentrations of various oxides of nitrogen ($NO_x$) and particulate matter (PM), because the diffusion flame, i.e., a long gas flame that radiates uniformly over its length and precipitates free carbon uniformly, results in fuel droplets disbursed in the fuel/air (F/A) charge burning near stoichiometry. A method of combustion identified as Homogeneous Charge Compression Ignition (HCCI), as described in copending U.S. application Ser. No. 08/905,789, filed on Jul. 28, 1997 by the inventor of the present application, has the potential to dramatically reduce $NO_x$ and PM emissions. This is due to the homogeneous mixture of fuel and air being able to provide a uniformly dispersed lean fuel mixture before the start of combustion in each compression stroke of the engine. However, it is difficult for a compression ignition diesel engine to operate in an HCCI mode over a wide speed and load range.

The present invention is directed to overcoming the problem of relatively high emissions in a conventional diesel engine. It is, therefore, desirable to have an diesel engine, and a method of operating a diesel engine in which HCCI combustion is combined with convention diesel combustion so that, when the engine is operating in the speed and load ranges suitable for HCCI combustion, the engine can operate in the homogeneous charge compression ignition mode and produce lower emissions. It is also desirable to have an engine that takes advantage of the low emissions potential of homogeneous charge compression ignition within selected portions of the operating range of a conventional diesel engine by combining the two modes of combustion in one engine.

SUMMARY OF THE INVENTION

In accordance with one aspect of the present invention, an apparatus for controlling the combustion mode of a diesel engine includes a means for controllably delivering fuel to the combustion chamber formed in each cylinder of the engine, a means for sensing engine operating parameters indicative of the engine speed and torque, i.e., load, and an electronic control unit in electrical communication with the means for controllably delivering fuel to each combustion chamber and with the means for sensing engine operating parameters indicative of the engine speed and load. The electronic control unit is adapted to deliver a first electronic signal to the means for controllably delivering fuel to the combustion chamber whereby fuel is injected into the chamber in an amount and at a time sufficient to form a nonhomogeneous mixture of fuel droplets and air, i.e., a conventional diesel combustion mode fuel-air mixture, in the chamber prior to and during combustion of the nonhomogeneous mixture, in response to sensing engine operating parameters indicative of engine speed and load values within a first predefined range. The electronic control unit delivers a second electronic signal to the means for controllably delivering fuel to the combustion chamber whereby fuel is injected into the combustion chamber in an amount and at a sufficiently early time to form a homogeneous mixture of fuel and air in the combustion chamber prior to combustion of the homogeneous mixture in response to sensing engine operating parameters indicative of engine speed and load values within a second predefined range.

Other features of the apparatus embodying the present invention include the means for controllably delivering fuel to each combustion chamber of the engine comprising, for each combustion chamber, a first fuel injector having at least a tip proportion disposed in the combustion chamber, and a second fuel injector having at least a tip portion disposed in the intake manifold or port associated with the combustion chamber. Still other features include the apparatus having a water injector which has a tip proportion disposed in each combustion chamber, and the electronic control unit being adapted to selectively deliver electronic signals to the water injector and to the first fuel injector to controllably inject water and fuel into the combustion chamber in response to sensing engine operating parameters indicative of engine speed and load values within a third predefined range.

Yet other features of the apparatus for controlling the combustion mode of a diesel engine, embodying the present invention, include the means for sensing engine operating parameters indicative of the engine speed and load comprising a temperature sensor and a pressure sensor disposed in the intake manifold associated with each combustion chamber, an engine speed sensor, and an engine coolant temperature sensor. Each of the sensors are in electrical communication with the electronic control unit.

Still additional features of the apparatus embodying the present invention include the diesel engine having an exhaust gas recirculation passageway in communication with the exhaust manifold and the intake manifold, and an exhaust gas recirculation control valve that is in electrical communication with the electronic control unit. The electronic control unit regulates the exhaust gas recirculation control valve to deliver a flow of recirculated exhaust gas to the intake manifold at a rate sufficient to reduce $NO_x$ in response to sensing engine operating parameters indicative of engine speed and load in the first predefined range, and at a rate sufficient to assure a predetermined minimum temperature of a homogeneous mixture of fuel, air and recirculated exhaust gas introduced into the combustion chamber, in response to sensing engine operating parameters indicative of engine speed and load values within the second predefined range. Also, the apparatus may include and oxygen sensor disposed in the exhaust manifold of the engine and in electrical communication with the electronic control unit.

In accordance with another aspect of the present invention, a method for controlling the combustion rate of a diesel engine includes sensing engine operating parameters indicative of the engine speed and load, delivering a first signal to a means for controllably delivering fuel to each combustion chamber of the engine and providing a nonhomogeneous mixture of fuel and air in each combustion chamber in response to sensing engine operating parameters indicative of engine speed and load values within a first predefined range, and delivering a second signal to the means for controllably delivering fuel to each combustion chamber of the engine and providing a homogeneous mixture of fuel and air in the combustion chamber in response to sensing engine operating parameters indicative of engine speed and load values within a second predefined range.

Other features of the method for controlling the combustion mode of a diesel engine, in accordance with the present invention, include delivering the first signal to a first fuel injector having at least a tip portion disposed within each combustion chamber, and delivering the second signal to a second fuel injector having at least a tip portion disposed in the intake manifold associated with each combustion chamber. Additional features include delivering a signal to a water injector having at least the tip portion disposed in each combustion chamber, and to the first fuel injector, and controllably injecting water and fuel into each combustion chamber in response to sensing engine operating parameters indicative of engine speed and load values within a third predefined range.

Still other features of the method for controlling the combustion mode of a diesel engine, embodying the present invention, include regulating the flow of recirculated exhaust gas to the intake manifold of each combustion chamber at a rate sufficient to reduce $NO_x$ in response to sensing engine operating parameters indicative of engine speed and load within the first predefined range, and at a rate sufficient to assure that the temperature of a homogeneous mixture of fuel, air and recirculated exhaust gas delivered to each combustion chamber has a predefined minimum value, in response to sensing engine operating parameters indicative of engine speed and load values within the second predefined range. Other features include the sensing of the engine operating parameters indicative of the engine speed and load values in the first and second ranges comprising the sensing the temperature and pressure in the intake manifold, the rotational speed of the engine, and the engine coolant temperature.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF PRESENTLY PREFERRED EXEMPLARY EMBODIMENTS

A method of combustion known as Homogeneous Charge Compression Ignition (HCCI) has the potential to dramatically reduce $NO_x$ and PM emissions because the mixture of fuel and air can be uniformly mixed to lean levels before combustion of the mixture. The HCCI combustion mode, and methods of controlling combustion in that mode, are described in detail in the above-referenced copending U.S. application Ser. No. 08/905,789, which is incorporated herein by reference for all purposes. However, HCCI has not heretofore been used in conventional diesel engines because HCCI combustion can only operate over a relatively narrow load range. Conventional diesel engines, which are capable of operating over wide speed and load range typically produce high $NO_x$ and PM emissions. In a conventional diesel engine, air is typically compressed in a combustion chamber and fuel injected into the chamber at or near the point of maximum compression, i.e. at or near top dead center (TDC) movement of the piston. In the HCCI combustion mode, the fuel and air charge is mixed together to form a substantially uniform, homogeneous mixture of fuel and air that is compressed prior to combustion. In the present invention, HCCI combustion is combined with conventional diesel combustion, enabling the engine to produce lower emissions than a conventional diesel engine while operating over the full speed and load range environment of the conventional diesel engine.

Figure 1:
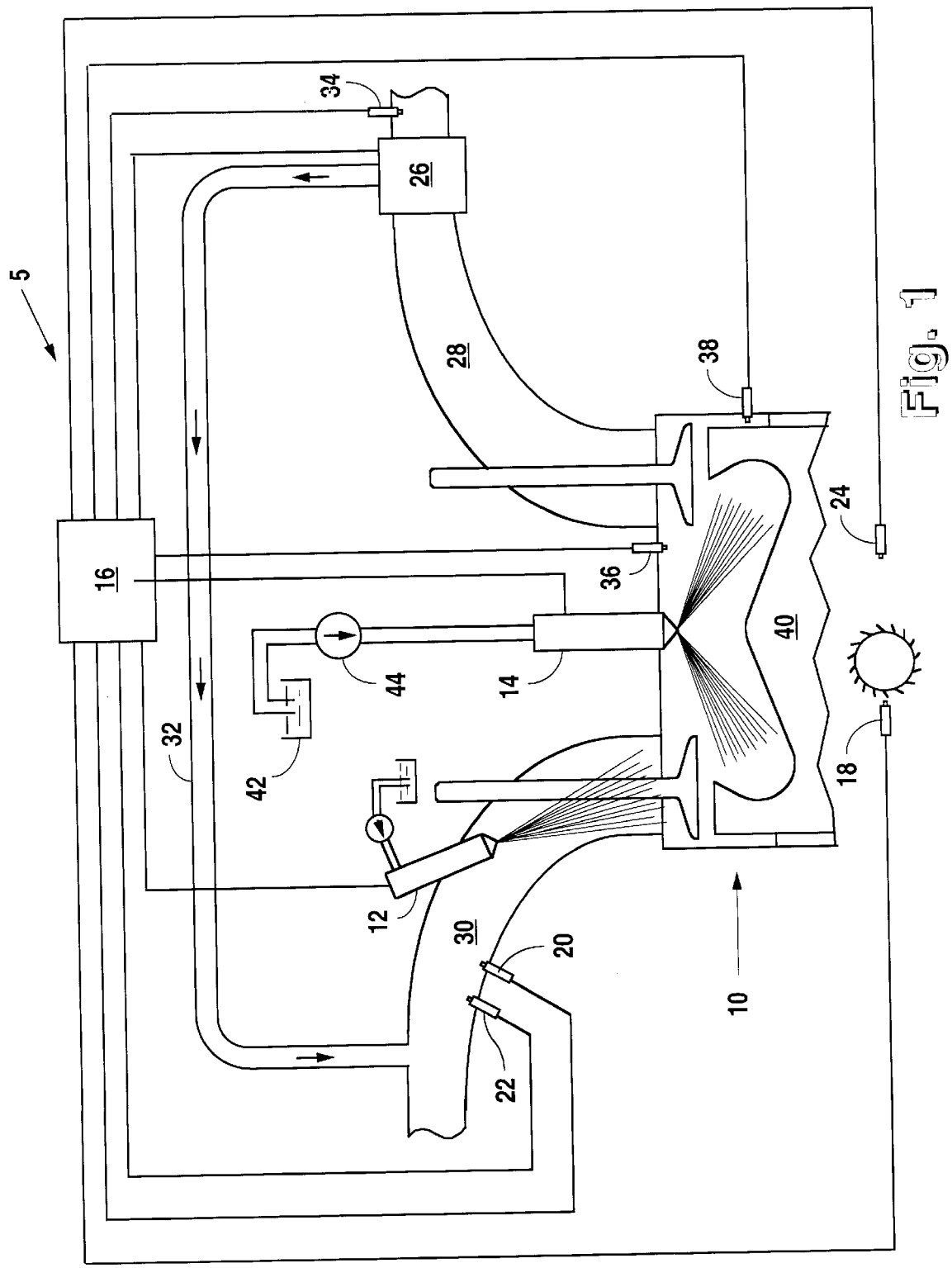
FIG. 1 is a schematic representation of a first embodiment of the apparatus for controlling the combustion mode of a diesel engine, embodying the present invention, wherein fuel is introduced into the combustion chamber of the diesel engine through a port fuel injector.
Figure 2:
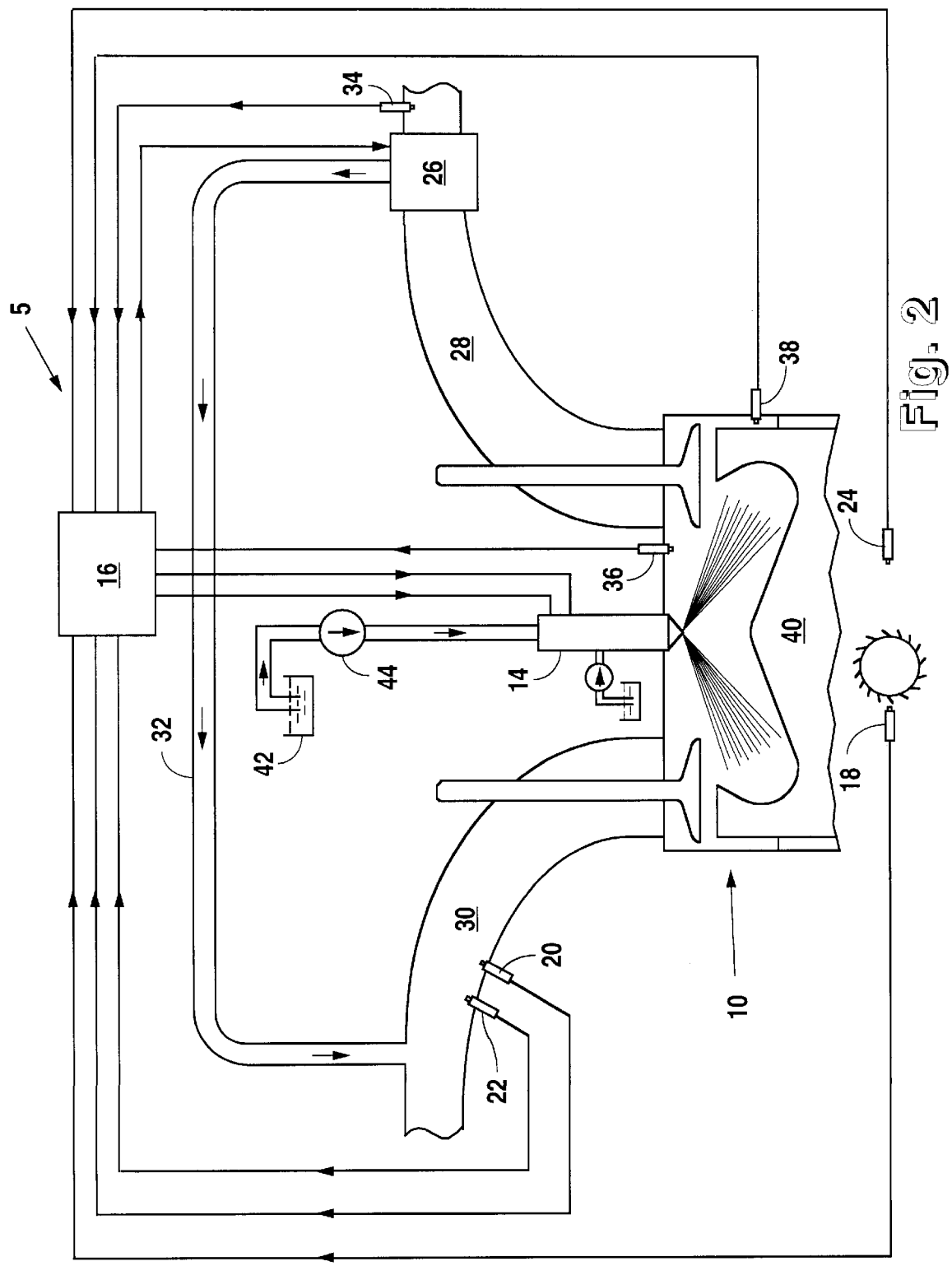
FIG. 2 is a schematic representation of a second embodiment of the apparatus for controlling the combustion mode of a diesel engine, embodying the present invention, wherein fuel is introduced into the combustion chamber through an in-cylinder fuel injector.

The present invention takes advantage of the low emission potential of HCCI combustion and the wide operating range of a conventional diesel engine to combine the two modes of combustion in a single engine. More particularly, an apparatus for controlling the combustion mode of a diesel engine is generally indicated by the reference numeral 5 in FIGS. 1 and 2. FIGS. 1 and 2 are similar except for the manner in which fuel is introduced into each combustion chamber 10 of the engine. In FIG. 1, fuel is selectively introduced into the engine through a port diesel fuel injector 12 disposed in an intake manifold 30 associated with the combustion chamber 10. In FIG. 2, an in-cylinder injector 14 is used to deliver fuel. The injectors 12, 14 are controlled as described below in greater detail to deliver fuel to the combustion chamber 10 in both conventional diesel combustion mode and the HCCI combustion mode.

An engine control unit 16 (ECU), of the type commonly used to control various engine operating parameters, is connected to an engine speed sensor 18 which detects rotational speed and real-time rotation angle position of the engine crankshaft, an intake manifold sensor pressure sensor 20, an intake manifold temperature sensor 22, an engine coolant sensor 24 and, if desired as a feedback signal, to a wide-ratio oxygen sensor 34. These sensors, in like manner as in conventional diesel engine control systems, deliver electronic controls to the ECU 16 whereat the quantity and timing of fuel injection is determined. Also, in the present invention, the ECU 16 selects the appropriate injector 12, 14 based upon the specific values of the above sensed parameters and, if desired, other parameters. The ECU 16 delivers control signals to the port of fuel injector 12, as shown in FIG. 1, or to the in-cylinder injector 14, as shown in FIG. 2. The actual fuel quantity injected into the cylinder during each combustion cycle will directly influence the fuel-air ratio and the engine output power.

Exhaust gas recirculation (EGR) is used in both the conventional diesel combustion mode and the Homogeneous Charge Compression Ignition combustion mode, to reduce $NO_x$ during operation of the conventional diesel mode, and to control the start of combustion (SOC) in the HCCI combustion mode. In the first embodiment, illustrated in FIG. 1, during engine speeds and loads that are favorable for HCCI operation, the in-cylinder fuel injection 14 is turned off, and the port fuel injector 12 is activated to create a homogeneous charge of fuel and air, as described below in greater detail. In both embodiments of the present invention, exhaust gas recirculation is regulated by an EGR valve 26 disposed in an exhaust manifold 28 communicating with the combustion chamber 10. Exhaust gas flow to the intake manifold 30 is directed by way of an EGR passageway 32 that extends between the EGR valve 26 and the intake manifold 30. Desirably, the recirculated exhaust gas is induced into the intake manifold 30 at a point upstream of the intake manifold pressure sensor 20 and the intake manifold temperature sensor 22. The exhaust gas recirculation flow rate is controlled by the ECU 16 by regulation of the position of the EGR valve 26 so that a desired flow rate of recirculated gas is directed to the intake port of the combustion chamber 10. An excessive amount of exhaust gas recirculation results in high intake air temperature and early start of combustion when the engine is operating in the HCCI combustion mode. Also while operating in the HCCI combustion mode, a low exhaust gas recirculation flow rate may result in low intake air temperatures and misfire. Thus, exhaust gas recirculation can be used to initiate combustion and control combustion rate when operating in the HCCI combustion mode. When operating in the conventional diesel combustion mode, exhaust gas recirculation can be used to reduce $NO_x$ as commonly practiced in current diesel engines.

In both fuel-delivery embodiments of the present invention, an applicable pressure type start-of-combustion (SOC) sensor 36 may be used to provide a feedback signal to the engine electronic control unit 16 so that the ECU 16 can alter exhaust gas recirculation flow rate and/or other variables to control emissions when operating in the conventional diesel combustion mode and control the start of combustion during operation in the HCCI combustion mode. The SOC sensor 36 can detect a premature or late start of combustion in the chamber 10 and provide a representative signal to the ECU 16. Additionally, a knock sensor 38 may be used to provide a feedback signal to the ECU 16 to avoid damaging engine knock.

The parameters used to control the start of combustion (SOC) for homogeneous charge compression ignition are typically intake air temperature and pressure, exhaust gas recirculation flow rate, and compression ratio. Heretofore it has not been possible to control these parameters on a cycle-by-cycle basis. For example, if the EGR flow rate is changed, it may take several engine cycles to affect an appreciable difference in intake manifold temperature due to the transport time and thermal inertia of the EGR system. Therefore, accurate cycle-by-cycle control of the SOC for HCCI operation is essential for optimum performance and emission control.

In the present invention, the in-cylinder injector 14 is modified to also selectively serve as a water injector to inject water into the homogeneous fuel-air mixture to control charge temperature and the SOC when operating in the HCCI combustion mode, or during high load and speed operation to augment the conventional diesel combustion mode with water injection. The in-cylinder injector 14, as shown in FIGS. 1 and 2, is in fluid communication with a source of pressurized water. The timing and length of time and conditions under which water injection occurs is controlled by an electrical signal delivered by the electronic control unit 16.

Thus, the quantity of water injected can be changed for each injection event for every engine cycle. Assuming that the compression ratio, i.e., the position of the piston 40 within the chamber 10, and the temperature of the intake fuel/air mixture are more than sufficient to initiate early combustion when operating in the HCCI mode, the water injection quantity can be changed on a cycle-by-cycle basis to control the SOC. Injecting water into the combustion chamber 10 will reduce the in-cylinder gas temperature to the level required to start combustion at the desired ignition point, generally near TDC. Injecting larger quantities will retard the start of combustion.

The in-cylinder injector 14 may be either a dual fluid injector, as described above, that is adapted to separately inject either water or diesel fuel at desired times before combustion, or when used in conjunction with the port fuel injector 12 may comprise a single injector for water. Also, diesel fuel may be injected directly into the combustion chamber 10 by a separate in-cylinder fuel injector, not shown. Water from an appropriate source, such as a tank or reservoir 42, in communication with a pump 44, advantageously provides a source of pressurized water to the in-cylinder injector 14. As mentioned above, the actual timing and the amount of water injected into the combustion chamber 10, i.e., the length of time that the in-cylinder injector nozzle is open, is controlled by the ECU 16. The in-cylinder injector 14 has a tip portion arranged to inject fuel toward the combustion chamber 10. More specifically, the tip portion of the in-cylinder injector 10 is generally disposed within the chamber 10, or in a relatively small prechamber that is in direct communication with a primary combustion chamber 10.

The engine speed sensor 18 typically detects engine speed by sensing the rotation of a known number of features, such as magnetic markers or gear teeth, that are mechanically connected to the engine crankshaft in a known relationship. Since the circumferential position of the magnetic markers or other features on the crankshaft are known, the real-time position of the crankshaft, commonly referred to as the crank angle, is also known. Furthermore, since the piston 40 is mechanically attached to the crankshaft via a connecting rod and associated bearings, the real-time position of the piston 40 with respect to the combustion chamber 10 can also be readily determined. Thus, the engine speed sensor 18 may be considered as a piston position sensor for determining the position of the piston 40 at a particular time during the compression stroke.

When fuel and water are directly injected into the engine, either by a single injection nozzle 14, or by way of separate in-cylinder injection nozzles, fuel is injected into the chamber 10 at a first selected time, as controlled by the ECU 16. When operating in a conventional diesel mode, the fuel injection occurs at or near the top of the compression stroke after substantial compression of the intake air charge. Thus, when engine operating parameters indicative of the engine speed and load are sensed that are representative of desired operation in a conventional diesel mode, the ECU 16 delivers a first electronic signal to a means for controllably delivering fuel to the combustion chamber, typically the in-cylinder fuel injector 14, whereby fuel is introduced into the combustion chamber 10 in an amount and at a time sufficient to form a substantially nonhomogeneous mixture of fuel droplets and air in the combustion chamber 10 prior to combustion.

When engine operating parameters indicative of the engine speed and load conducive to operation in an HCCI combustion mode, the ECU 16 delivers a second signal to the means for controllably delivering fuel to the combustion chamber 10, i.e. typically the port fuel injector 12, to advance the fuel injection event to a point at or near the end of the intake stroke or near the beginning of the compression stroke, i.e., when the piston is at or near bottom dead center (BDC), to simultaneously compress the fuel-air mixture and form a substantially homogeneous mixture of fuel and air in the combustion chamber 10 prior to combustion.

Figure 3:
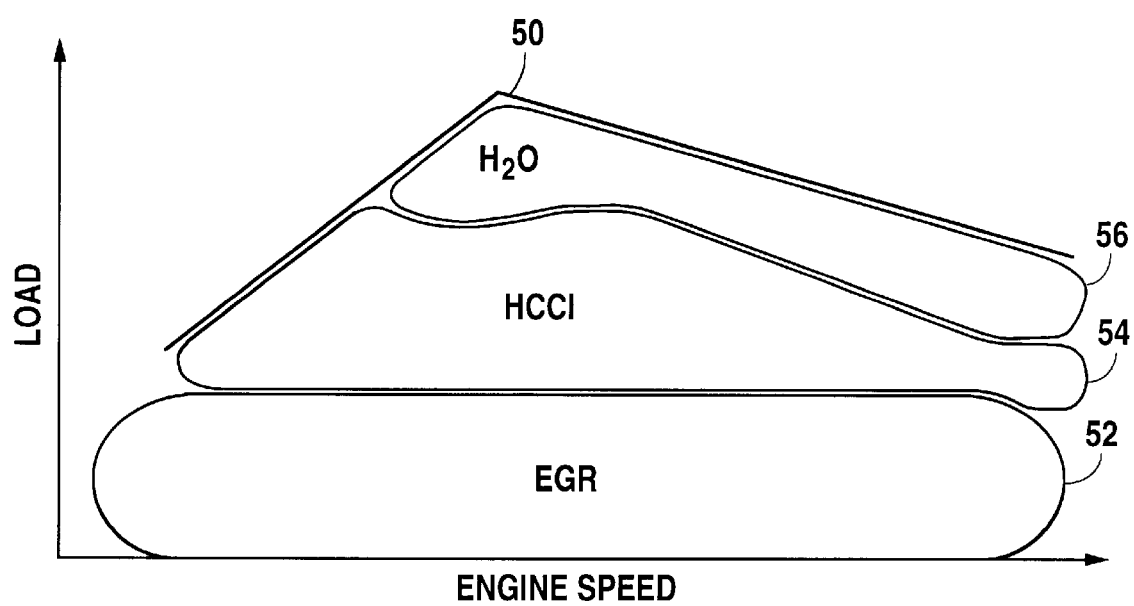
FIG. 3 is a graph representing a typical diesel engine speed and load operating range, with representative operating areas identified for different combustion modes, in accordance with the apparatus and method embodying the present invention.

A conventional diesel engine is typically capable of operating over a relatively broad speed and load range. For example, a typical speed and load range of a diesel engine is represented in FIG. 3 by solid straight lines 50. Load values increases as speed increases, up to a maximum load value, after which with continued increase in engine speed, the load values, i.e., the torque characteristics, of the engine gradually decrease. The various desirable operating modes for an engine equipped with the apparatus 5 embodying the present invention, are defined by separately inscribed areas under the load-speed curve 50. The lower area identified by the reference numeral 52, and labeled "EGR", represents conventional diesel mode operation over the entire operating speed range of the engine, and at relatively low loads. In this mode, exhaust gas recirculation is desirably used to reduce $NO_x$ and particulate emissions. At higher loads, as represented by area 54 labeled "HCCI", conditions conducive for HCCI combustion are present. If desired, as represented by the area identified by the reference numeral 56 and labeled "$H_2O$", water may be combined with conventional diesel combustion at high load to control $NO_x$ emission.

Thus, FIG. 3 is an engine map showing the speed and loads where conventional diesel combustion and HCCI combustion modes can coexist in the operational range of a conventional diesel engine. The combination of the two combustion modes in one engine provides an engine that operates over the entire typical engine operating range, but has the capability of using HCCI combustion within appropriate load ranges, to achieve emission levels lower than that previously possible in an engine operating in only a conventional diesel combustion mode. Hopefully, the HCCI combustion mode operating range may be expanded in the future for greater net emissions reduction over the total operating range of the engine.

The following description explains how an engine, using the apparatus 5 embodying the present invention, operates in the diesel combustion mode, the HCCI combustion mode, and in transition between modes of combustion.

DIESEL COMBUSTION MODE CONTROL

The engine will start as a conventional diesel engine and warm up. Diesel engine combustion occurs when fuel is injected into the combustion chamber 10, at near top dead center (TDC), and spontaneously ignites due to the high cylinder gas temperature. The fuel burns as a diffusion flame near stoichiometry for the diesel combustion event. The high flame temperatures generally produce high $NO_x$ emission, which may be advantageously reduced by the use of exhaust gas circulation. Diluents such as exhaust gas recirculation (EGR) and/or water injection can be used in a diesel engine to control peak combustion temperature and therefore lower $NO_x$ emission. The fuel injector 14 may be adapted, as described above, to inject water and/or fuel directly into the combustion chamber 10. When operating in a relatively light load range, as represented by the area 52 in the speed-load graph shown in FIG. 3, the EGR valve may be modulated to control the amount of exhaust gas recirculated to the intake manifold 30. Exhaust gas recirculation limits peak flame temperature and thus can reduce $NO_x$ emissions.

When operating in the high load range, as represented by the area 56 in FIG. 3, water and/or exhaust gas recirculation may be included with a conventional diesel combustion to control $NO_x$ emissions. The engine control unit 16 may be used to control both the exhaust gas recirculation valve 26, and water injection timing and quantity, based on sensed engine operating parameters indicative of the engine speed and load, such as intake manifold temperature, intake manifold pressure, engine speed, and engine coolant temperature and, if appropriate, exhaust gas recirculation flow rate and air-fuel ratio. Thus, the apparatus 5 for controlling the combustion mode of the engine when operating in a conventional diesel combustion mode, includes a fuel injector 14 which provides a means for controllably delivering fuel to the combustion chamber 10. Also, the apparatus 5 includes a plurality of sensors, specifically the temperature sensor 22 and the pressure sensor 20 position in the intake manifold 30, the engine speed sensor 18, and the engine coolant temperature 24 each of which are in electrical communication with the ECU 16, which collectively provide a means for sensing engine operating parameters that are indicative of the engine speed and load. The ECU 16 delivers a first electronic signal to the injector 14 to inject the fuel into the combustion chamber 10 in an amount and at a time sufficient to form a nonhomogeneous mixture of fuel droplets and air in the combustion chamber 10 prior to and during combustion of the fuel-air charge, in response to sensing engine operating parameters indicative of engine speed and load valves within a first predefined range, represented by the area 52 in FIG. 3. Also, the ECU 16 selectively delivers signals to the water injector-fuel injector 14 to controllably inject water and fuel into the combustion chamber 10 in response to sensing engine operating parameters indicative of engine speed and load valves within a third predefined range, as represented by the area 56 in FIG. 3. Alternatively, if desired, engine operation in the first area 52 and the third area 56 may be carried out solely using conventional diesel combustion without EGR or water addition.

HCCI COMBUSTION MODE CONTROL

HCCI combustion occurs when a lean homogeneous charge of diesel fuel and air begins combustion at or near the end of the engine compression stroke. Homogeneous mixture of fuel and air can be created by using the automotive style port fuel injector 12, or early (near BDC) direct in-cylinder fuel injection, i.e. early fuel injection, through the in-cylinder fuel injector 14. The thermodynamic condition and temperature-time relationship of the mixture must be correct for preflame reactions and combustion to occur. Typically, EGR is used in a HCCI combustion mode to raise the intake gas temperature to a level where HCCI combustion will occur. Recirculated exhaust gas is a diluent that can also control combustion rate. HCCI combustion is characterized by multiple combustion sites in a lean charge so that the peak flame temperature is similar to the bulk gas temperature. The resultant low peak flame temperature (relative to conventional diesel diffusion flame combustion) results in $NO_x$ emissions that are 90% to 98% lower than those produced in typical diesel combustion mode operation.

However there are two problems with HCCI combustion. First, it is difficult to control the start of combustion (SOC) as mentioned above. Combustion boundaries are lean-misfire on one side and knock on the other side. Secondly, with the current state of the art, HCCI combustion can only be controlled over a limited engine operating range, as represented by the area 54 in FIG. 3. The HCCI combustion mode is controlled in a similar manner as that of the conventional diesel combustion mode. The ECU 16 is connected to a means for sensing engine operating parameters indicative of the engine speed and load, e.g. such as the engine speed sensor 18, the manifold pressure sensor 20, the manifold temperature sensor 22, and the engine coolant temperature 24, to calculate the fuel quantity and timing. The wide ratio oxygen sensor 34 may also be used to measure oxygen concentration in the exhaust. When the sensed engine operating parameters are indicative of engine speed and load valves within a second predefined range, as represented by the area 54 in FIG. 3, the ECU 16 sends a signal to a means for controllably delivering fuel to the combustion chamber 10, typically the port diesel fuel injector 12, whereby fuel is injected into the intake manifold 30 in an amount and at a time sufficient to form a homogeneous mixture of fuel and air in the combustion chamber 10 prior to combustion.

Also, the exhaust gas recirculation rate may be controlled to provide favorable intake charge temperature. Thus, the EGR control valve 26 may be regulated to deliver a flow or recirculated exhaust gas to the intake manifold 30 at a rate sufficient to provide a predetermined temperature of the homogeneous mixture of fuel, air and recirculated exhaust gas in the combustion chamber 10 in response to sensing engine operating parameters indicative of engine speed and load valves within the second predefined range, identified by the area 54 in FIG. 3. Also, if desired the SOC sensor 36 may provide feedback to the ECU 16 so that the ECU can alter EGR flow rate and other variables to control the start of combustion and produce efficient, low emission HCCI engine performance. Additionally, if desired, the knock sensor 38 may be used for feedback in the HCCI mode to avoid damaging engine knock.

DUAL COMBUSTION MODE CONTROL

Once the engine operating parameters indicative of engine speed, load, temperature and pressure, are sensed, various methods may be used to determine at what points the combustion mode should be switched between direct injection diesel and HCCI combustion for the most desirable operation. For example, the engine may be mapped to create a look-up table in the ECU 16 that will define the speed and load ranges at which the engine will run in conventional diesel mode, and at what speeds and load ranges the engine will switch to the HCCI mode, or from HCCI mode to conventional diesel mode with water injection. The look-up table can be updated using an adaptive learning algorithm. Also, model-based control can be used to calculate, on a real-time basis, if conditions are favorable for HCCI operation. Model-based control can also be used to calculate the transition conditions at which the engine should switch between conventional diesel and HCCI combustion modes.

The SOC sensor 36 and the knock sensor 38 can be used as a feedback for either of the above control strategies. The SOC sensor 36 will provide information on start-of-combustion timing and also indicate the lack of combustion or misfire. If early or late combustion is detected, EGR rate, fuel quantity and timing can be changed to optimize the start of combustion. If misfire is determined, the engine can be further optimized in HCCI mode or switched back to conventional diesel mode. If knock is detected from the knock sensor 38, the engine can either be optimized in HCCI mode or switched back to conventional diesel operation.

An illustrative example of the combined HCCI and conventional diesel combustion modes is as follows. The engine will start as a conventional diesel engine, and operate at any demanded speed-load condition (shown in FIG. 3) until the engine is warmed up. The engine will then operate as a conventional diesel engine over the speed and load range, represented by the areas 52 and 56 on the speed-load graph shown in FIG. 3, which would have predetermined values depending on the application of the engine. When engine operating conditions are favorable for HCCI operation, as represented by the area 54 in FIG. 3, i.e. coolant temperature, intake temperature, engine speed and manifold pressure, and if applicable EGR flow rate, the engine will switch to the HCCI mode. If the homogeneous charge is created using the port fuel injector 12, the port fuel injector 12 can be "switched on" and the in-cylinder injector 14 will be "switched off". If the homogeneous charge is created using the in-cylinder diesel injector 14, the fuel injection timing will be advanced to near BDC of the intake stroke. When the engine operating conditions are no longer favorable for HCCI operation, the port fuel injector 12 will be turned off, and the direct in-cylinder diesel injector 14 will be turned on for conventional diesel operation. Alternatively, if the homogeneous charge is created using very early in-cylinder injection, the injection timing of the in-cylinder injector 14 will be retarded to return to the conventional diesel combustion mode.

Although the present invention is described in terms of preferred exemplary embodiments, with specific illustrative fuel and water injection arrangements and sensors for controlling various engine operation parameters and combustion modes, those skilled in the art will recognize the changes in those arrangements, types of sensors and specific control strategies may be made without departing from the spirit of the invention. Such changes are intended to fall within the scope of the following claims. Other aspects, features and advantages of the invention may be obtained from the study of this disclosure and the drawings, along with the appended claims.

What is claimed is:

1. An apparatus for controlling the combustion mode of a diesel engine having at least one combustion chamber and an inlet port in communication with an intake manifold and said combustion chamber, said apparatus comprising:

a means for controllably delivering fuel to said combustion chamber;

a means for sensing engine operating parameters indicative of the engine speed and load; and an electronic control unit in electrical communication with said means for controllably delivering fuel to said combustion chamber and with said means for sensing engine operating parameters indicative of the engine speed and load, said electronic control unit being adapted to deliver a first electronic signal to said means for controllably delivering fuel to said combustion chamber whereby fuel is injected into said combustion chamber in an amount and at a time sufficient to form a nonhomogeneous mixture of fuel droplets and air in said combustion chamber prior to and during combustion of said nonhomogeneous mixture in response to sensing engine operating parameters indicative of engine speed and load values within a first predefined range, and deliver a second electronic signal to said means for controllably delivering fuel to said combustion chamber whereby fuel is injected into said combustion chamber in an amount and at a time sufficient to form a homogeneous mixture of fuel and air in said combustion chamber prior to combustion of said homogeneous mixture in response to sensing engine operating parameters indicative of engine speed and load values within a second predefined range.

2. An apparatus for controlling the combustion mode of a diesel engine, as set forth in claim 1, wherein said means for controllably delivering fuel to said combustion includes a first fuel injector in fluid communication with a source of fuel and having a tip portion thereof disposed in said combustion chamber, and a second fuel injector in fluid communication with a source of fuel and having at least a tip portion thereof disposed in said intake manifold.

3. An apparatus for controlling the combustion mode of a diesel engine, as set forth in claim 2, wherein said apparatus includes a water injector in selective controllable fluid communication with a source of water and having at least a tip portion thereof disposed in said combustion chamber, and said electronic control unit is adapted to selectively deliver electronic signals to said water injector and to said first fuel injector to controllably inject water and fuel into said combustion chamber in response to sensing engine operating parameters indicative of engine speed and load values within a third predefined range.

4. An apparatus for controlling the combustion mode of a diesel engine, as set forth in claim 3, wherein the diesel engine has an exhaust manifold in communication with said combustion chamber, an exhaust gas recirculation passageway in communication with said exhaust manifold and said intake manifold, and an exhaust gas recirculation control valve in electrical communication with said electronic control unit, whereby said electronic control unit regulates said exhaust gas recirculation control valve to deliver a flow of recirculated exhaust gas to said intake manifold at a rate sufficient to reduce $NO_x$ in response to sensing engine operating parameters indicative of engine speed and load in at least one of said first and third predefined ranges, and at a rate sufficient to provide a predetermined temperature of said homogeneous mixture of fuel, air and recirculated exhaust gas in the combustion chamber in response to sensing engine operating parameters indicative of engine speed and load values within said second predefined range.

5. An apparatus for controlling the combustion mode of a diesel engine, as set forth in claim 1, wherein said means for sensing engine operating parameters indicative of the engine speed and load include a temperature sensor and a pressure sensor disposed in said intake manifold, an engine speed sensor, and an engine coolant temperature sensor, each of said sensors being in electrical communication with said electronic control unit.

6. An apparatus for controlling the combustion mode of a diesel engine, as set forth in claim 1, wherein the diesel engine has an exhaust manifold in communication with said combustion chamber, and said apparatus includes an oxygen sensor disposed in said exhaust manifold and in electrical communication with said electronic control unit.

7. A method for controlling the combustion mode of a diesel engine having at least one combustion chamber, an inlet port in communication with an intake manifold and said combustion chamber, a means for controllably delivering fuel to said combustion chamber, and a means for sensing engine operating parameters indicative of the engine speed and load, said method comprising:

sensing the engine operating parameters indicative of the engine speed and load;

delivering a first signal to said means for controllably delivering fuel to said combustion chamber and providing a nonhomogeneous mixture of fuel droplets and air in said combustion chamber in response to sensing engine operating parameters indicative of engine speed and load values within a first predefined range; and delivering a second signal to said means for controllably delivering fuel to said combustion chamber and providing a homogeneous mixture of fuel droplets and air in said combustion chamber in response to sensing engine operating parameters indicative of engine speed and load values within a second range.

8. A method for controlling the combustion mode of a diesel engine, as set forth in claim 7, wherein said delivering a first signal to said means for controllably delivering fuel to said combustion chamber includes delivering a signal to a first fuel injector having at least a tip portion thereof disposed in the combustion chamber, and said delivering a second signal to said means for controllably delivering fuel to said combustion chamber includes delivering a signal to a second fuel injector having at least a tip portion thereof disposed in the intake manifold of said engine.

9. A method for controlling the combustion mode of a diesel engine, as set forth in claim 8, wherein the diesel engine includes a water injector in selective controllable fluid communication with a source of water and having at least a tip portion thereof disposed in said combustion chamber, and said method includes:

selectively delivering signals to said water injector and to said first fuel injector and controllably injecting water and fuel into said combustion chamber in response to sensing engine operating parameters indicative of engine speed and load values within a third predefined range.

10. A method for controlling the combustion mode of a diesel engine, as set forth in claim 9, wherein the diesel engine has an exhaust manifold in communication with said combustion chamber, an exhaust gas recirculation passageway in communication with said exhaust manifold and said intake manifold, said method including regulating the flow of exhaust gas through said exhaust gas recirculation passageway and delivering a flow of recirculated exhaust gas to said intake manifold at a rate to sufficient to reduce $NO_x$ in response to said sensing engine operating parameters indicative of engine speed and load in said first predefined range, and at a rate sufficient to assure that the temperature of a homogeneous mixture of fuel, air and recirculated exhaust gas delivered to the combustion chamber has a predefined minimum value, in response to sensing engine operating parameters indicative of engine speed and load values within said second predefined range.

11. A method for controlling the combustion mode of a diesel engine, as set forth in claim 7, wherein sensing the engine operating parameters indicative of the engine speed and load values in said first range and in said second range includes sensing the temperature and pressure in said intake manifold, the rotational speed of said engine, and the engine coolant temperature.

* * * * *